US008477826B2

(12) United States Patent
Sanji et al.

(10) Patent No.: US 8,477,826 B2
(45) Date of Patent: Jul. 2, 2013

(54) WIRELESS COMMUNICATION SYSTEM

(75) Inventors: Kenichiro Sanji, Okazaki (JP); Akira Takaoka, Okazaki (JP); Hiromichi Naitoh, Okazaki (JP); Masahiro Sugiura, Takahama (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 334 days.

(21) Appl. No.: 12/925,635

(22) Filed: Oct. 26, 2010

(65) Prior Publication Data

US 2011/0128995 A1 Jun. 2, 2011

(30) Foreign Application Priority Data

Nov. 27, 2009 (JP) ................................ 2009-269997

(51) Int. Cl.
*H04B 1/00* (2006.01)
(52) U.S. Cl.
USPC ........................................................ 375/145
(58) Field of Classification Search
None
See application file for complete search history.

(56) References Cited

U.S. PATENT DOCUMENTS

| 5,943,362 A * | 8/1999 | Saito .............................. 375/143 |
| 2007/0016362 A1 * | 1/2007 | Nelson .......................... 701/200 |
| 2008/0232431 A1 | 9/2008 | Sanji et al. |
| 2009/0323772 A1 | 12/2009 | Sanji et al. |

FOREIGN PATENT DOCUMENTS

| JP | 5-219011 | 8/1993 |
| JP | 8-237170 | 9/1996 |
| JP | 2008-231734 | 10/2008 |
| JP | 2010-11061 | 1/2010 |

* cited by examiner

*Primary Examiner* — Chieh M Fan
*Assistant Examiner* — Wednel Cadeau
(74) *Attorney, Agent, or Firm* — Harness, Dickey & Pierce, PLC

(57) ABSTRACT

In a wireless communication system, a portable device transmits a first signal spread based on a reference period indicated by a synchronization signal transmitted from an in-vehicle device and transmits a second signal spread based on an operation by a user. The in-vehicle device sets a search period based on a variation range in a delay time from when the synchronization signal is transmitted to when the spread first signal is transmitted and sets a residual period that starts at an ending point of the search period and ends at an ending point of the reference period when a starting point of the reference period is set at a starting point of the search period. When the in-vehicle device fails in a synchronous acquisition for the search period, the in-vehicle device performs a synchronous acquisition process for the residual period.

15 Claims, 6 Drawing Sheets

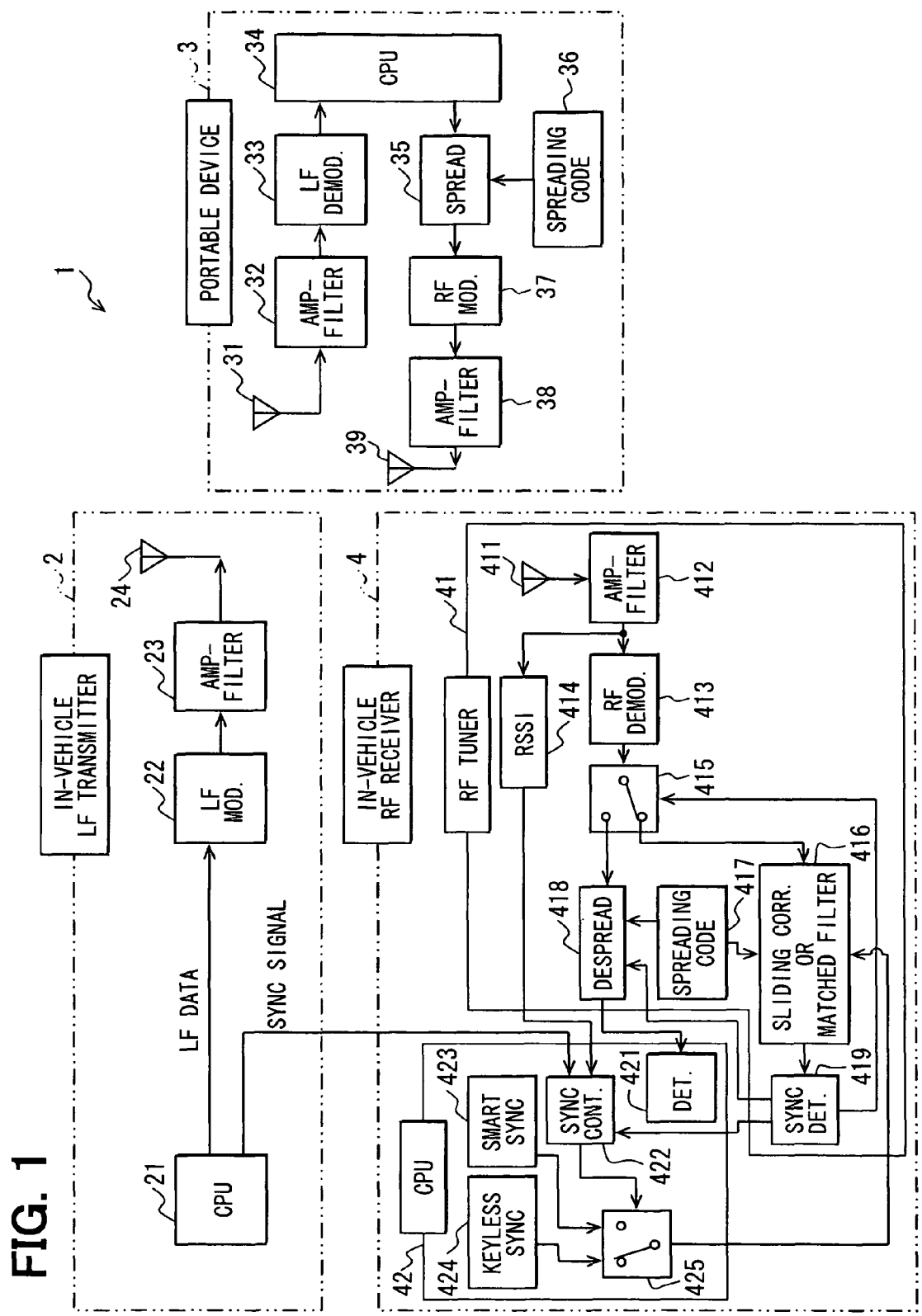

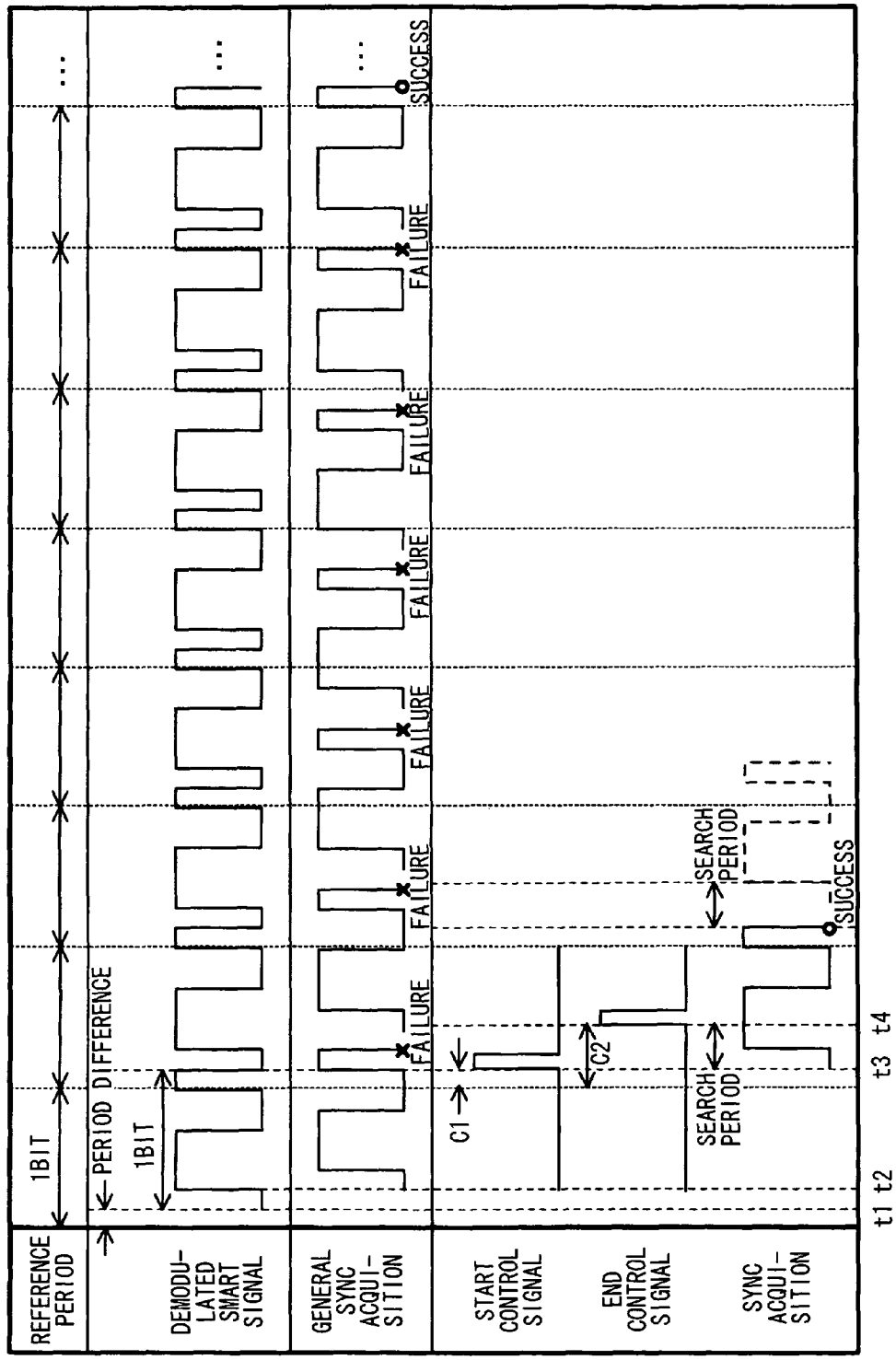

FIG. 4A
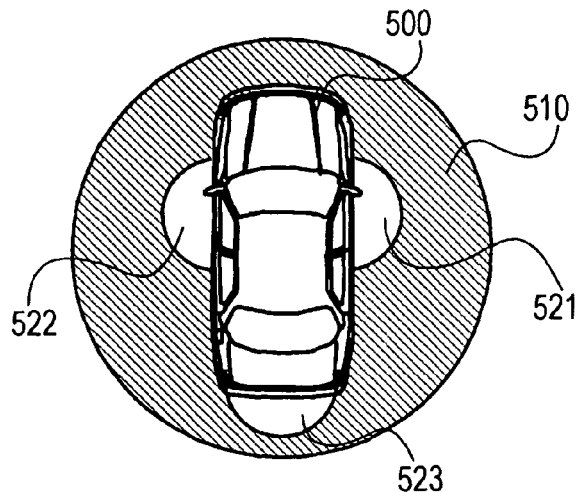
FIG. 4B
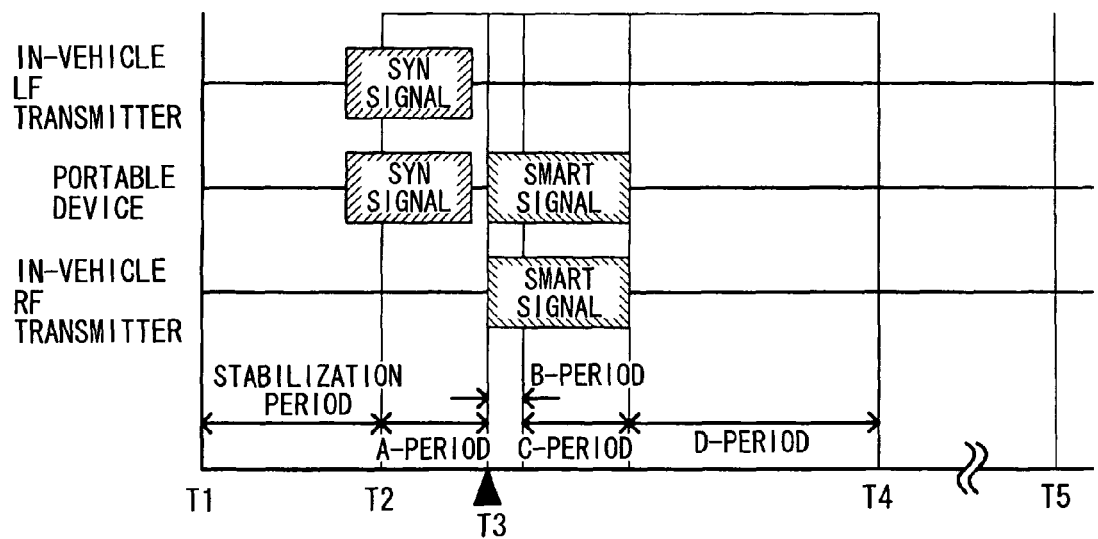
FIG. 4C
| A-PERIOD | KEYLESS SIGNAL |
| B-PERIOD | SMART SIGNAL AND KEYLESS SIGNAL |
| C-PERIOD | SMART SIGNAL AND KEYLESS SIGNAL |
| D-PERIOD | KEYLESS SIGNAL |

WIRELESS COMMUNICATION SYSTEM

CROSS REFERENCE TO RELATED APPLICATIONS

The present application is based on and claims priority to Japanese Patent Application No. 2009-269997 filed on Nov. 27, 2009, the contents of which are incorporated in their entirety herein by reference.

BACKGROUND OF THE INVENTION

1. Field of the Invention

The present invention relates to a wireless communication system in which a portable device carried by a user transmits a wireless signal to an in-vehicle device mounted on a vehicle by a spread spectrum method.

2. Description of the Related Art

In a wireless communication by a spread spectrum method, an original signal is spread by a spreading code at a transmitting end to generate a spread signal, and the spread signal is despread by the spreading code at a receiving end. In the spread spectrum method, the receiving end needs a synchronous acquisition of the spread signal and the spreading code. The synchronous acquisition can be performed, for example, by using a sliding correlator or a matched filter. Methods of performing a synchronous acquisition using a sliding correlator are disclosed, for example, in JP-A-5-219011 and JP-A-8-237170.

U.S. 2009/0323772 A (corresponding to JP-A-2010-011061) by some of the inventors of the present application discloses a wireless communication system for reducing a time required for a synchronous acquisition and improving a responsiveness. In the wireless communication system, an in-vehicle device transmits a reference period to a portable device before a wireless communication by a spread spectrum method and a synchronous adjustment is performed. The potable device transmits a wireless signal that is spread based on the reference period. The in-vehicle device performs a synchronous acquisition using a sliding correlator or a matched filter within a range that is set in view of variation in delay time generated in the synchronous adjustment.

When the wireless communication system is applied to a smart entry system, a time required for the synchronous acquisition can be reduced, and a responsiveness of the wireless communication system can be improved.

In general, a smart entry system coexists with a keyless entry system in which a vehicle door is locked and unlocked by a remote control by a user. Also in the keyless entry system, a spread spectrum modulation is performed using the same spreading code as the smart entry system. Lock and unlock of the vehicle door by the keyless entry system is based on an operation by a user and needs to be performed prior to a process by the smart entry system.

In the wireless communication system, the in-vehicle device performs the synchronous acquisition of a received signal within the range set in view of variation in the delay time. Thus, when the in-vehicle device receives a keyless signal that is transmitted regardless of the reference period instead of a smart signal, the in-vehicle device may fail in the synchronous acquisition. Thus, a process by the keyless entry system may delay and a responsiveness to an operation by a user may be reduced.

SUMMARY OF THE INVENTION

In view of the foregoing problems, it is an object of the present invention to provide a wireless communication system that can reduce a time required for a synchronous acquisition of a spread first signal without reducing a responsiveness of a process based on a second signal.

A wireless communication system according to an aspect of the present invention includes a portable device and an in-vehicle device. The portable device is configured to spread one of a first signal and a second signal by a first spreading code and to transmit a wireless signal that is one of a spread first signal and a spread second signal. The in-vehicle device is configured to receive the wireless signal and to despread a received wireless signal by a second spreading code identical to the first spreading code to wirelessly communicate with the portable device by a spread spectrum method. The in-vehicle device transmits a synchronization signal to the portable device to inform the portable device of a reference period determined by the in-vehicle device. When the portable device receives the synchronization signal while the portable device is not transmitting the spread second signal, the portable device changes the first spreading code synchronously with the synchronization signal, spreads the first portable devise signal by the changed first spreading code, and transmits the spread first signal. When the portable device receives a predetermined operation by a user, the portable device stops transmitting the spread first signal, spreads the second signal by the first spreading code, and transmits the spread second signal. When the in-vehicle device receives the wireless signal after transmitting the synchronization signal, the in-vehicle device performs a first synchronous acquisition process of searching for a synchronous acquisition point for a search period. The synchronous acquisition point is a point where a correlation value in despreading becomes a maximum value. The search period is determined based on a variation range in a delay time from when the in-vehicle device transmits the synchronization signal to when the portable device transmits the spread first signal. The search period is from a search starting point to a search ending point and is shorter than the reference period. When the in-vehicle device fails in the first synchronous acquisition process, the in-vehicle device performs a second synchronous acquisition process of searching for the synchronous acquisition point for a residual period. The residual period starts at the search ending point and ends at an ending point of the reference period when a starting point of the reference period is set at the search starting point. When the in-vehicle device succeeds in one of the first synchronous acquisition process and the second synchronous acquisition process, the in-vehicle device changes the second spreading code synchronously with the received wireless signal, and despreads the received wireless signal by a changed second spreading code.

The wireless communication system can reduce a time required for the synchronous acquisition of the spread first signal without reducing a responsiveness of a process based on the second signal.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 1 is a block diagram showing a wireless communication system according to an embodiment of the present invention;

FIG. 2 is a timing chart showing a general synchronous acquisition and a synchronous acquisition based on a synchronization signal;

FIG. 4A is a diagram showing a keyless operation area and smart operation areas;

FIG. 4B is a timing chart showing a communication timing of the wireless communication system;

FIG. 4C is a diagram showing a relationship between various periods and a type of RF signal received by an in-vehicle RF receiver;

DETAILED DESCRIPTION OF THE PREFERRED EMBODIMENTS

Figure 3A:
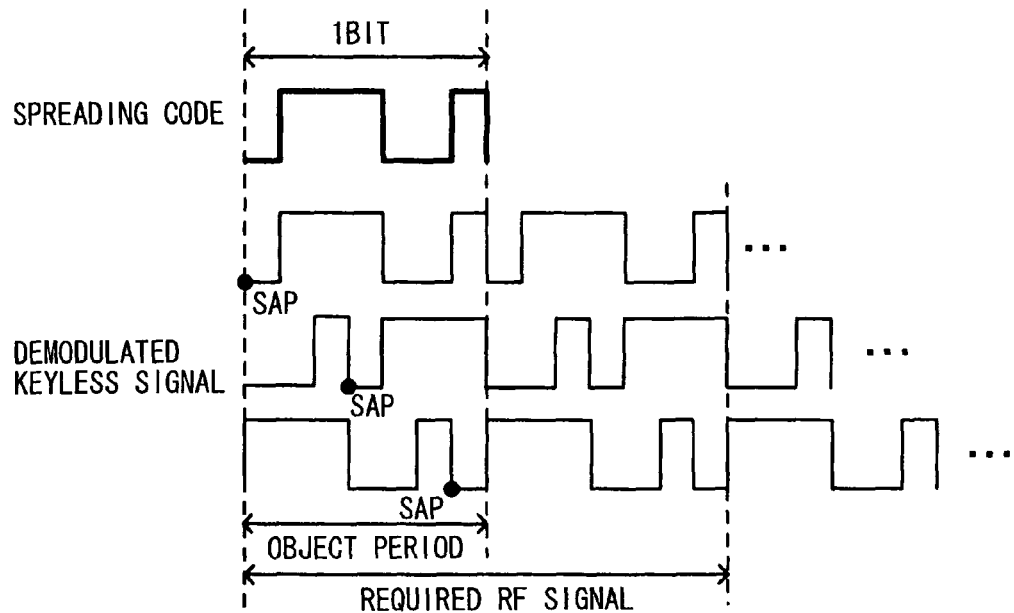
FIG. 3A is a timing chart showing a synchronous acquisition of a keyless signal.

Before describing preferred embodiments of the present invention, exemplary aspects of the present invention will be described.

A wireless communication system according to an aspect of the present invention includes a portable device and an in-vehicle device. The portable device spreads one of a first signal and a second signal by a first spreading code and transmits a wireless signal that is one of a spread first signal and a spread second signal. The in-vehicle device receives the wireless signal and despreads a received wireless signal by a second spreading code identical to the first spreading code to wirelessly communicate with the portable device by a spread spectrum method. The in-vehicle device transmits a synchronization signal to the portable device to inform the portable device of a reference period determined by the in-vehicle device. When the portable device receives the synchronization signal while the portable device is not transmitting the spread second signal, the portable device changes the first spreading code synchronously with the synchronization signal, spreads the first signal by the changed first spreading code, and transmits the spread first signal. When the portable device receives a predetermined operation by a user, the portable device stops transmitting the spread first signal, spreads the second signal by the first spreading code, and transmits the spread second signal.

A time from a starting point to an ending point of the reference period may be, for example, a time corresponding to 1 cycle of spreading, that is, a time obtained by multiplying the number of chips of the spreading code by a time of 1 chip of spreading.

As described in U.S. 2009/0323772 A, when the portable device does not receive an electric wave from the in-vehicle device, the portable device may be in a sleep mode. Then, when the portable device detects the electric wave from the in-vehicle device by a received signal strength indicator (RSSI), a mode of the portable device may change from the sleep mode to a wake mode. When a distance between the in-vehicle device and the portable device changes, a detection time when the RSSI in the portable device detects the electric wave from the in-vehicle device also changes. A circuit delay time of each of the in-vehicle device and the portable device also changes. Thus, a delay time from when the in-vehicle device transmits the synchronization signal to when the portable device changes the first spreading code synchronously with the synchronization signal, spreads the first signal by the changed first spreading code and transmits the spread first signal also changes. A variation range in the delay time can be estimated, for example, based on an experimental result or a simulation result.

In the wireless communication system, when the in-vehicle device receives the wireless signal after transmitting the synchronization signal, the in-vehicle device performs a first synchronous acquisition process of searching for a synchronous acquisition point for a search period. The synchronous acquisition point is a point where a correlation value in despreading becomes a maximum value. The search period is determined based on the variation range in the delay time from when the in-vehicle device transmits the synchronization signal to when the portable device transmits the spread first signal so that a starting point of the spread first signal is certainly included in the search period.

Thus, in the wireless communication system, a time required for completing a synchronous acquisition of the spread first signal can be reduced compared with a method in which a synchronous acquisition is performed without performing a synchronous adjustment, that is, a method in which a synchronous acquisition is performed for a search period corresponding to 1 cycle of the reference period. Therefore, a responsiveness of the wireless communication system can be improved.

When the portable device receives a predetermined operation by a user, the portable device spreads the second signal and transmits the spread second signal to the in-vehicle device prior to the first signal. Thus, the in-vehicle device needs to receive the spread second signal instead of the first spread portable device signal. A synchronous adjustment is not performed for the second signal. The in-vehicle device needs to perform the synchronous acquisition of the spread second signal for a period corresponding to 1 cycle of the reference period.

Thus, in the wireless communication system, when the in-vehicle device fails in the first synchronous acquisition process, the in-vehicle device performs a second synchronous acquisition process of searching for the synchronous acquisition point for a residual period. The residual period starts at the search ending point and ends at the ending point of the reference period when the starting point of the reference period is set at the search starting point. When the in-vehicle device succeeds in one of the first synchronous acquisition process and the second synchronous acquisition process, the in-vehicle device changes the second spreading code synchronously with the received wireless signal, and despreads the received wireless signal by a changed second spreading code.

By performing the first synchronous acquisition process and the second synchronous acquisition process, a synchronous acquisition for a period corresponding to 1 cycle of the reference period can be performed. Thus, even when the in-vehicle device receives the spread second signal instead of the spread first signal, the in-vehicle device can perform the synchronous acquisition. Thus, a delay of a process based on the second signal can be restricted.

In this way, the wireless communication system according to the aspect of the present invention can reduce the time required for the synchronous acquisition of the spread first signal without reducing the responsiveness of the process based on the second signal.

When the operation by a user is performed almost simultaneously with the synchronous adjustment, there is a possibility that the portable device starts transmitting the spread second signal just after starting transmitting the spread first signal. In such a case, there is a possibility that a signal for which the synchronous acquisition point is searched changes from the spread first signal to the spread second signal during the first synchronous acquisition process or the second synchronous acquisition process.

Thus, in the above-described wireless communication system, when the in-vehicle device fails in the second synchronous acquisition process, the in-vehicle device may search for the synchronous acquisition point for a period that starts after the residual period ends and has a length same as the reference period.

In the above-described case, even when a signal for which the synchronous acquisition point is searched changes from the spread first signal to the spread second signal during the first synchronous acquisition process or the second synchronous acquisition process, and the in-vehicle device fails in the first synchronous acquisition process and the synchronous acquisition process, the in-vehicle device can succeed in the synchronous acquisition.

There is a possibility that even after the in-vehicle device succeed in the synchronous acquisition of the spread first signal and starts despreading the spread first signal, the portable device transmits the spread second signal instead of the spread first signal based on the operation by a user while the in-vehicle device is despreading the spread first signal. In such a case, the in-vehicle device may fail in despreading the spread first signal.

Thus, in the above-described wireless communication system, when the in-vehicle device detects a failure in despreading after starting despreading, the in-vehicle device may search for the synchronous acquisition point for a period that starts after the in-vehicle device detects the failure and has a length same as the reference period.

In the above-described case, even when the portable device starts transmitting the spread second signal instead of the spread first signal while the in-vehicle device is despreading the spread first signal, the in-vehicle device can perform the synchronous acquisition of the spread second signal and can perform the process based on the second signal.

There is a possibility that the portable device transmits the spread second signal based on the operation by a user even when the portable device ends transmitting the spread first signal, the in-vehicle device ends despreading the spread first signal, and the in-vehicle device performs the process based on the first signal. In such case, the in-vehicle device cannot disregard the operation by the user and the in-vehicle device needs to despread the spread second signal and to perform the process based on the second signal.

Thus, in the above-described wireless communication system, when the in-vehicle device succeeds in the first synchronous acquisition and when the in-vehicle device receives the wireless signal from the portable device while the in-vehicle device is performing the process based on the first signal, the in-vehicle device may search for the synchronous acquisition point for a period that starts after the in-vehicle device starts receiving the wireless signal and has a length same as the reference period is set at the first point.

In the above-described case, even when the portable device starts transmitting the spread second signal while the in-vehicle device is performing the process based on the first signal, the in-vehicle device can perform the synchronous acquisition of the spread second signal and can perform the process based on the second signal.

In the above-described wireless communication system, the in-vehicle device may have a standby mode and a normal mode. When the in-vehicle device is in the standby mode, the in-vehicle device does not receive the wireless signal from the portable device for reducing electric power consumption. When the in-vehicle device is in the normal mode, the in-vehicle device receives the wireless signal from the portable device. A mode of the in-vehicle device may change from the standby mode to the normal mode at intervals of a first predetermined time. The mode of the in-vehicle device may change from the normal mode to the standby mode at a second predetermined time. The reference period may be determined based on the intervals of the first predetermined time. The portable device may transmit the spread second signal including a preliminary part and a main part. The preliminary part is transmitted for a period corresponding to a sum of the first predetermined time and a receiving time of the wireless signal for which the synchronous acquisition point is searched in the first synchronous acquisition process and the second synchronous acquisition process. The main part includes a transmission data from the portable device to the in-vehicle device and is transmitted following the preliminary part.

In the above-described case, even when the in-vehicle device fails in the synchronous acquisition performed after the second synchronous acquisition due to influence by noises, the in-vehicle device can receive the spread second signal corresponding to the preliminary part at a time when the first synchronous acquisition process and the second synchronous acquisition process are performed in the normal mode after next wake-up. Thus, even when the in-vehicle device fails in the synchronous acquisition after the second synchronous acquisition process, the in-vehicle device can certainly receive the preliminary part of the spread second signal as a signal used for the next first synchronous acquisition process and the next second synchronous acquisition process, and the in-vehicle device can succeed in the synchronous acquisition by the first synchronous acquisition process and the second synchronous acquisition process for the preliminary part. Therefore, the in-vehicle device can start receiving the main part after completing the synchronous acquisition, the in-vehicle device can certainly despread the main part, and the in-vehicle device can obtain the transmission data.

A wireless communication system 1 according to an embodiment of the present invention will be described below. The wireless communication system 1 has both a so-called smart entry function and a so-called keyless entry function. For example, the smart entry function can unlock a door of a vehicle when a specific portable device carried by an authorized user of the vehicle enters a predetermined wireless communication area around the vehicle. For example, the keyless entry function can lock and unlock the door of the vehicle in response to operation of a button on the portable device.

The wireless communication system 1 includes an in-vehicle LF transmitter 2, a portable device 3, and an in-vehicle RF receiver 4. The in-vehicle LF transmitter 2 can transmit an LF signal of a low frequency band. The portable device 3 can receive the LF signal. In addition, the portable device 3 can transmit an RF signal of a higher frequency than the LF signal by a spread spectrum method. For example, the RF signal may have a frequency of about 300 MHz. The in-vehicle RF receiver 4 receives the RF signal by a spread spectrum method. The in-vehicle LF transmitter 2 and the in-vehicle RF receiver 4 can function as an in-vehicle device.

The in-vehicle LF transmitter 2 includes a central processing unit (CPU) 21, an LF modulator 22, an amplifier-filter 23, and an LF transmitting antenna 24. The CPU 21 outputs a LF data including a synchronization signal to the LF modulator 22. The LF data is modulated by the LF modulator 22, passed through the amplifier-filter 23, and then transmitted from the LF transmitting antenna 24. The CPU 21 also transmits the synchronization signal to the in-vehicle RF receiver 4 through an internal bus.

The portable device 3 includes an LF receiving antenna 31, an amplifier-filter 32, an LF demodulator 33, a CPU 34, a spreading portion 35, an RF modulator 37, an amplifier-filter 38, and an RF transmitting antenna 39. The LF signal transmitted from the in-vehicle LF transmitter 2 is received by the LF receiving antenna 31, passed through the amplifier-filter 32, and then demodulated by the LF demodulator 33. The CPU 34 generates a smart signal based on transmission data in a smart entry system. The CPU 34 also generates a keyless signal based on transmission data in a keyless entry system. The keyless signal is the same form as the smart signal. The spreading portion 35 spreads a code of the keyless signal or the smart signal output from the CPU 34 with a spreading code 36. The spreading code 36 has an N chips. For example, the spreading code 36 may have 7 chips. The signal spread by the spreading portion 35 is modulated by the RF modulator 37, passed through the amplifier-filter 38, and transmitted from the RF transmitting antenna 39.

When the CPU 34 receives the synchronization signal through the LF transmitting antenna 24 while the CPU 34 is not outputting the keyless signal, the CPU 34 outputs the smart signal and the spreading code 36 in timing based on the synchronization signal. The spreading portion 35 spreads the smart signal by the spreading code 36, the spread smart signal is modulated by the RF modulator 37, and the modulated smart signal is transmitted from the RF transmitting antenna 39 through the amplifier-filter 38. When the CPU 34 receives a predetermined operation through an operation portion (not shown) while the CPU 34 is outputting the smart signal, the CPU 34 stops outputting the smart signal and outputs the keyless signal and the spreading code 36 to the spreading portion 35. The spreading portion 35 spreads the keyless signal by the spreading code 36, the spread keyless signal is modulated by the RF modulator 37, and the modulated keyless signal is transmitted from the RF transmitting antenna 39 through the amplifier-filter 38.

The in-vehicle RF receiver 4 includes an RF tuner 41 and a CPU 42. The RF tuner 41 receives the RF signal and demodulates the RF signal. The CPU 42 performs a synchronous acquisition of the RF signal demodulated by the RF tuner 41.

The RF tuner 41 includes an RF receiving antenna 411, an amplifier-filter 412, an RF demodulator 413, a received signal strength indicator (RSSI) 414, a switch 415, a sliding correlator 416, a despreading portion 418, a synchronization detector 419. The RF tuner 41 may also include a matched filter instead of the sliding correlator 416. The RF signal transmitted from the RF transmitting antenna 39 is received by the RF receiving antenna 411, passed through the amplifier-filter 412, and then demodulated by the RF demodulator 413. The RSSI 414 detects a receiving of the RF signal and outputs a signal to the CPU 42. When a receiving of the RF signal starts, the switch 45 outputs the demodulated RF signal to the sliding correlator 416. When the sliding correlator 416 ends a synchronous acquisition, the switch 415 outputs the demodulated RF signal to the despreading portion 418. The sliding correlator 416 or the matched filter performs a synchronous acquisition of the demodulated RF signal with a spreading code 417 of 7 chips based on a signal from the CPU 42. The despreading portion 428 despreads the demodulated RF signal by the spreading code 417. The synchronization detector 419 outputs a synchronous acquisition point detected by the sliding correlator 416 to the CPU 42.

The CPU 42 includes a determining portion 421, a synchronous control portion 422, a smart synchronizing part 423, a keyless synchronizing part 424, and a switch 425. The determining portion 421 determines whether a signal from the despreading portion 418 is a keyless signal or a smart signal. The synchronous control portion 422 performs the synchronous acquisition by controlling the sliding correlator 416.

The synchronous acquisition performed by the wireless communication system 1 will be described with reference to FIG. 2.

The in-vehicle LF transmitter 2 sets a reference period. The reference period has a period corresponding to 1 bit of the transmission data of the smart signal. The in-vehicle LF transmitter 2 transmits a synchronization signal from which the reference period can be specified to the portable device 3 as the LF signal. When the portable device 3 receives the synchronization signal, the portable device 3 extracts the reference period from the synchronization signal. The portable device 3 spreads the smart signal by the spreading code 36 in such a manner that the synchronous acquisition point at which a correlative value becomes the maximum value coincides with a starting point of the reference period. Then, the portable device 3 transmits the spread signal as the RF signal. Specifically, the portable device 3 modulates the smart signal while adjusting a time in such manner that transmitting of the RF signal is started at the starting point of the reference period extracted from the synchronization signal, and transmits the modulated smart signal.

A detection time of the RSSI 414 in the in-vehicle RF receiver 4 changes in accordance with a distance between the in-vehicle LF transmitter 2 and the portable device 3, and the detection time changes within a certain range. A circuit delay time of each of the in-vehicle LF transmitter 2, the portable device 3, and the in-vehicle RF receiver 4 changes within a certain range. Thus, a period difference may be generated between an actual reference period in the in-vehicle 20. LF transmitter 2 and the reference period detected by the portable device 3.

The period difference can be estimated based on an experimental result or a simulation result. Based on a range of the estimated period difference, in the demodulated RF signal, a period where the synchronous acquisition point exists can be specified based oh the starting point of each reference period. The period is defined as a search period. The in-vehicle RF receiver 4 searches for the synchronous acquisition point doe the search period.

In the timing chart in FIG. 2, an example of a general synchronous acquisition and an example of the above-described synchronous acquisition based on the synchronization signal are shown. The signal obtained by demodulating the RF signal received from the portable device 3 is the smart signal that is spread by the spreading code 36 of 7 chips. When the synchronous acquisition is performed by the general method, for example, the CPU 42 sets an arbitrary starting point and observes a correlation using the sliding correlator 416 while shifting a phase of the spreading code by 1 chip, and thereby performing the synchronous acquisition. In the general method, the CPU 42 performs the correlation observation while shifting the starting point for 1 period (i.e., 7 times) so as to search the starting point where the correlation values becomes the maximum, and thereby performing the synchronous acquisition. When the correlation value greater than a predetermined threshold value is detected during the correlation observation for 1 period, the CPU 42 can set the starting point at a time when the correlation value is detected as the synchronous acquisition point and can end the correlation observation.

The synchronous acquisition based on the synchronization signal can be performed, for example, as follows. Based on the estimated range of the period difference, a first compensation time C1 and a second compensation time C2 are previously calculated. The CPU 42 sets a point at which the first compensation time C1 elapses from the starting point of the reference period as a search starting point. The CPU 42 sets a point at which the second compensation time C2 elapses from the starting point of the reference period as a search ending point. The CPU 42 sets a period from the search starting point to the search ending point as a search period. The CPU 42 transmits a start control signal to the sliding correlator 416, at the search starting point. The CPU 42 transmits an end control signal to the sliding correlator 416 at the search ending point.

From t1, the sliding correlator 416 receives the demodulated smart signal. At t2, the sliding correlator 416 becomes a state where the sliding correlator 416 can try the synchronous acquisition. However, the sliding correlator 416 does not start trying the synchronous acquisition immediately and waits for the start control signal from the CPU 42. When the sliding correlator 416 receives the start control signal at t3, the sliding correlator 416 performs the correlation observation while shifting the phase of the spreading code by 1 chip until t4 when the sliding correlator 416 receives the end control signal. In other words, the sliding correlator 416 performs the correlation observation during the search period. In the example shown in FIG. 2, the search period has a length corresponding to 2 chips. Thus, the sliding correlator 416 performs the correlation observation while shifting the starting point for the search period (i.e., 2 times) and searches the starting point where the correlation value becomes the maximum value, and thereby performing the synchronous acquisition. When the sliding correlator 416 detects the correlation value greater than a predetermined threshold value during the correlation observation, the sliding correlator 416 may set the starting point at which the correlation value is detected as the synchronous acquisition point and may end the correlation observation. In the example shown in FIG. 2, the synchronous acquisition point of the demodulated smart signal coincides with t3. The sliding correlator 416 detects the correlation value greater than the predetermined threshold value and succeeds in the synchronous acquisition during the first correlation observation.

In the above-described example, the sliding correlator 416 performs the synchronous acquisition by performing the correlation observation in real time with respect to an input signal. Even when the sliding correlator 416 performs the synchronous acquisition by buffering the input signal and performing the correlation observation for the buffered input signal, the sliding correlator 416 can perform the synchronous acquisition by the above-described method based on the synchronization signal. Even when the matched filter is provided instead of the sliding correlator 416, the matched filter can perform the synchronous acquisition by the above-described method.

The portable device 3 spreads the keyless signal and the smart signal and transmits the spread keyless signal and the spread smart signal as the RF signals. The synchronous acquisition of the keyless signal and the synchronous acquisition of the smart signal will be described below on the assumption that the sliding correlator 416 buffers the input signal and performs the synchronous acquisition for the buffered input signal.

The keyless signal is spread and transmitted in response to an operation by a user regardless of the synchronization signal. Thus, as shown in FIG. 3A, the sliding correlator 416 needs to search the synchronous acquisition point (SAP) in an object period corresponding to 1 bit of the transmission data of the spread keyless signal in a manner similar to the general synchronous acquisition. For example, the sliding correlator 416 buffers the keyless signal having a length of 2 bits of the transmission data, calculates the correlation value while shifting the phase of the spreading code by 1 chip and detects a point where the correlation value becomes the maximum value as the synchronous acquisition point.

Figure 3B:
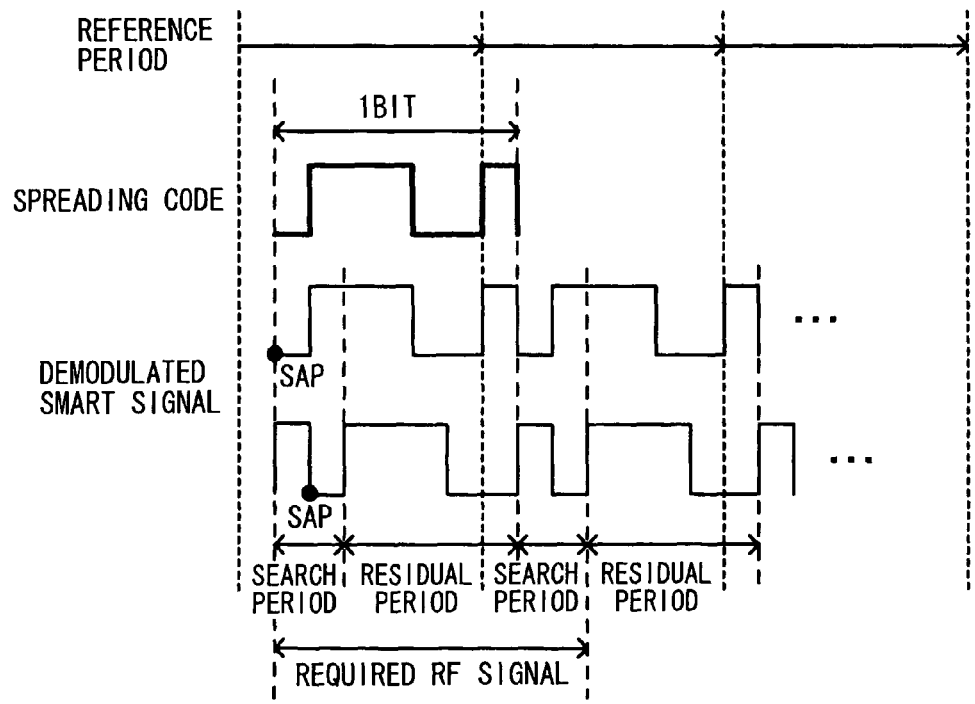
FIG. 3B is a timing chart showing a synchronous acquisition of a smart signal based on the synchronization signal.

As described above, the smart signal is spread and transmitted in timing based on the synchronization signal. Thus, as shown in FIG. 3B, when the search period has a length of 2 chips, the sliding correlator 416 buffers the spread smart signal having a length of about 1.3 bits of the transmission data. Then, the sliding correlator 416 calculates the correlation value while shifting the phase of the spreading code by 1 chip up to 2 times and detects a point where the correlation value becomes the maximum as the synchronization acquisition point (SAP).

The length of the search period and the number of bits of the smart signal to be buffered change in accordance with the period difference. In the present embodiment, it is assumed that the search period has the length of 2 chips and the number of bits of the smart signal is about 1.3 bits.

Next, an operation area of the smart entry system and an operation area of the keyless entry system of the wireless communication system 1 according to the present embodiment will be described with reference to FIG. 4A.

In the present embodiment, an keyless operation area 510 is an circular area with a radius of about 10 meters, and a center of the keyless operation area 510 is positioned at a center of a vehicle 500 in which the in-vehicle LF transmitter 2 and the in-vehicle RF receiver 4 are mounted. The in-vehicle RF receiver 4 can receive the RF signal transmitted from the portable device 3 within the keyless operation area 510.

Semicircles with a radius about 1 meter in the vicinity of a driver side door, a passenger side door, and a rear trunk of the vehicle 500 are set to smart operation areas 521, 522, and 523, respectively. The portable device 3 within one of the smart operation areas 521, 522, and 523 can receive the LF signal transmitted from the in-vehicle LF transmitter 2.

Thus, when a user having the portable device is within the keyless operation area 510, the user can use only the keyless entry system. When the user is within one of the smart operation areas 521, 522, and 523, the user can use both of the smart entry system and keyless entry system. Therefore, when the user is within one of the smart operation area 521, 522, and 523, the in-vehicle RF receiver 4 has a possibility of receiving both of the smart signal and the keyless signal.

A communication timing of the LF signal by the in-vehicle LF transmitter 2 and a communication timing of the RF signal by the portable device 3 will be described with reference to FIG. 4B.

The in-vehicle RF receiver 4 has a standby mode and a normal mode. When the in-vehicle RF receiver 4 is in the standby mode, the in-vehicle RF receiver 4 is powered off except for a part for reducing electric power consumption and the in-vehicle RF receiver 4 cannot receive the RF signal. When the in-vehicle RF receiver 4 is in the normal mode, all parts of in-vehicle RF receiver 4 are powered on and the in-vehicle RF receiver 4 can receive the RF signal. As shown in FIG. 4B, when the in-vehicle RF receiver 4 is powered on at T1, the in-vehicle RF receiver 4 changes from the standby mode to the normal mode. After elapsing a predetermined time from T1, the in-vehicle LF transmitter 2 transmits the synchronization signal to the portable device 3 as the LF signal. At T2, when a stabilization period elapses from T1, the in-vehicle RF receiver 4 becomes able to receive the RF signal. The in-vehicle RF receiver 4 becomes able to receive the RF signal after the in-vehicle LF transmitter 2 starts to transmit the synchronization signal.

As described above, the search period where the synchronous acquisition point of the smart signal transmitted as the RF signal is specified for each reference period based on the synchronization signal. In the search periods, one search period in which a transmission starting point of the smart signal exists is specified as a first search period. A period from when the in-vehicle RF receiver 4 becomes able to receive the RF signal at T2 to when the first search period starts at T3 is defined as an A-period. A period from when the first search period starts at T3 to when the in-vehicle RF receiver 4 ends receiving the smart signal required for searching for the synchronization acquisition point existing in the first search period is defined as a B-period. In the above-described example, the B-period is a period required to receive the smart signal having a length of about 1.3 bits of the transmission data. In the present embodiment, the search period where the transmission starting point of the smart signal exists is set to the first search period, as an example. Other search period may also be set to the first search period.

When the portable device 3 receives the synchronization signal as the LF signal, the portable device 3 spreads the smart signal in timing based on the synchronization signal and transmits the spread smart signal as the RF signal. A period from an end of the B-period to when the portable device 3 ends transmitting the spread smart signal is defined as a C-period. A period from an end of the C-period to when the in-vehicle RF receiver 4 is powered off except for a part and a mode of the in-vehicle RF receiver 4 changes from the normal mode to the standby mode at T4 is defined as a D-period.

After elapsing a predetermined time from T4, the in-vehicle RF receiver 4 is powered on again and the mode of the in-vehicle RF receiver 4 changes from the standby mode to the normal mode at T5. The change from the standby mode to the normal mode is also described as wake-up.

The portable device 3 transmits the keyless signal as the RF signal prior to the smart signal in response to an operation by a user. Thus, as shown in FIG. 4C, during the A-period and the D-period, the in-vehicle RF receiver 4 has a possibility of receiving only the keyless signal. During the B-period and the C-period, the in-vehicle RF receiver 4 has a possibility of receiving both of the keyless signal and the smart signal.

In the present embodiment, the wake-up of the in-vehicle RF receiver 4 is performed at intervals of about 100 milliseconds. The keyless signal includes a plurality of frames, and each of the frames is shorter than the intervals of the wake-up. A relationship between the intervals of the wake-up and the time of the keyless signal is set so that the in-vehicle RF receiver 4 can receive at least one frame and the RF signal for 2 bits regardless of the timing of the wake-up. The frames are signals based on the transmission data of the keyless entry system.

The keyless signal may also include a preliminary part and a main part. The preliminary part is transmitted for a period corresponding to the sum of the interval of the wake-up and the receiving time of the RF signal for 2 bits of the transmission data that is required for the synchronous acquisition. The main part follows the preliminary part. The main part is a signal based on the transmission data of the keyless entry system. The preliminary part is a signal based on dummy data, a signal based on the transmission data, or a signal based on dummy data and the transmission data.

Figure 5:
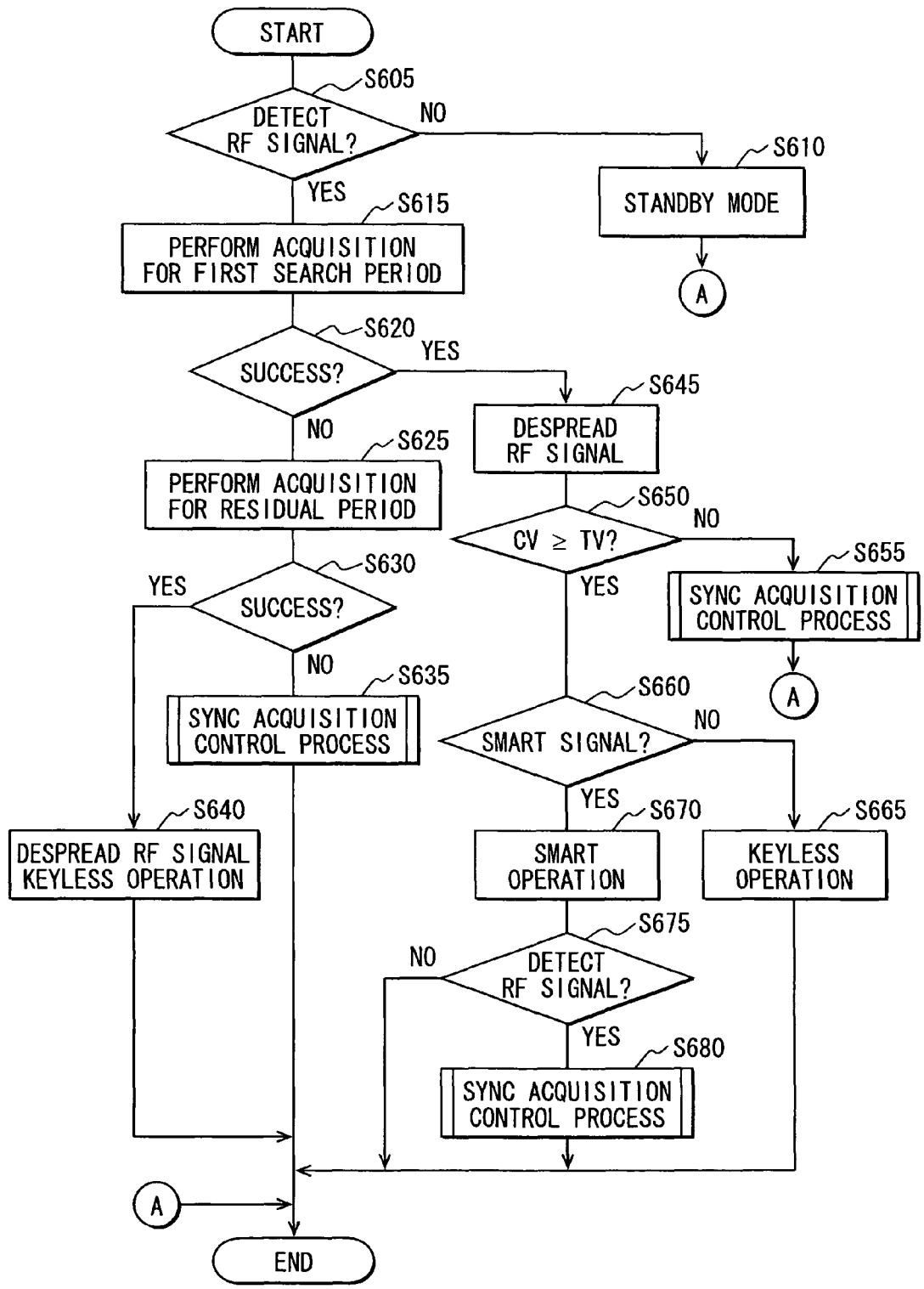
FIG. 5 is a flowchart showing an RF signal receiving process.

An RF signal receiving process performed by the in-vehicle RF receiver 4 will be described with reference to FIG. 5. The RF signal receiving process is started when the B-period shown in FIG. 4B starts.

At S605, the CPU 42 in the in-vehicle RF receiver 4 determines whether the RSSI 414 detects a receiving of the RF signal. When a receiving of the RF signal is detected, which corresponds to "YES" at S605, the process proceeds to S615. When a receiving of the RF signal is not detected from the B-period to the D-period, which corresponds to "NO" at S605, the process proceeds to S610.

At S610, the CPU 42 changes the mode of the in-vehicle RF receiver 4 to the standby mode and ends the RF signal receiving process. At S615, the CPU 42 transmits a control signal to the sliding correlator 416 so that the sliding correlator 416 searches for the synchronous acquisition point for the first search period using the RF signal received during the B-period shown in FIG. 4B, and the synchronous acquisition for the first search period is performed. The present synchronous acquisition corresponds to the above-described synchronous acquisition based on the synchronization signal. The synchronous acquisition for the first search period is performed by the smart synchronizing part 423, which is a program for operating the CPU 42. After the synchronous acquisition for the first search period ends, the process proceeds to S620.

At S620, the CPU 42 determines whether the synchronous acquisition at S615 succeeds. When the CPU 42 determines that the synchronous acquisition at S615 succeeds, which corresponds to "YES" at S620, the process proceeds to S645. When the CPU 42 determines that the synchronous acquisition at S615 does not succeed, which corresponds "NO" at S620, the process proceeds to S625.

At S625, the CPU 42 sets a residual period shown in FIG. 3B. The residual period starts at an ending point of the search period and ends when a time corresponding to 1 bit of the transmission data elapses from a starting point of the search period. Then, a synchronous acquisition for the residual period is performed with the sliding correlator 416 in a manner similar to the synchronous acquisition at S615. Specifically, the sliding correlator 416 searches for the synchronous acquisition point for the residual period using the RF signal received from a starting point of the residual period to a point when a time for 1 bit of the transmission data elapses after an ending point of the residual period. The synchronous acquisition for the residual period is performed by the keyless synchronizing part 424, which is a program for operating the CPU 42. After the synchronous acquisition for the residual period ends, the process proceeds to S630

At S630, the CPU 42 determines whether the synchronous acquisition at S625 succeeds. When the CPU 42 determines that the synchronous acquisition at S625 succeeds, which corresponds to "YES" at S630, the process proceeds to S640. When the CPU 42 determines that the synchronous acquisition at S625 does not succeed, which corresponds "NO" at S630, the process proceeds to S635.

At S635, the CPU 42 performs a synchronous acquisition control process which is a subroutine. After the synchronous acquisition control process ends, the CPU 42 ends the present process. At S640, the CPU 42 transmits a control signal to the despreading portion 418 so that the despreading portion 418 starts despreading the demodulated RF signal. When the synchronous acquisition for the residual period is succeed, the received RF signal is based on the keyless signal. Thus, the CPU 42 performs a process of the keyless entry system based on the keyless signal and ends the present process.

At S645, the CPU 42 transmits a control signal to the despreading portion 418 so that the despreading portion 418 starts despreading the demodulated RF signal.

At S650, the CPU 42 determines whether a correlation value (CV) in the despreading demodulation is greater than or equal to a threshold value (TV). When the CPU 42 determines that the correlation value is greater than the threshold value, which corresponds to "YES" at S650, the process proceeds to S655.

At S655, the CPU 42 performs the synchronous acquisition control process which is the subroutine. After the synchronous acquisition control process ends, the CPU 42 ends the present process. When the synchronous acquisition for the first search period succeeds, a case where the smart signal is received and a case where the keyless signal is received can be supposed. Thus, at S660, the CPU 42 determines whether the received signal is the smart signal or the keyless signal based on a signal obtained by the despreading demodulation. When the CPU 42 determines that the received signal is the keyless signal, which corresponds to "NO" at S660, the process proceeds to S665. When the CPU 42 determines that the received signal is the smart signal, which corresponds to "YES" at S660, the process proceeds to S670.

At S665, the CPU 42 performs a process in the keyless entry system based on the received keyless signal and ends the present process. At S670, the CPU 42 performs a process in the smart entry system based on the received smart signal and ends the present process.

At S675, the CPU 42 determines whether the RSSI 414 detects a receiving of another RF signal. When the receiving of another RF signal is not detected, which corresponds to NO at S675, the CPU 42 ends the present process. Even when the present process ends, the process in the smart entry system is continued. When the receiving of another RF signal is detected, which corresponds to "YES" at S675, the CPU 42 ends the process in the smart entry system, and the process proceeds to S680.

At S680, the CPU 42 performs the synchronous acquisition control process which is the subroutine. After the synchronous acquisition control process ends, the CPU 42 ends the present process.

Figure 6:
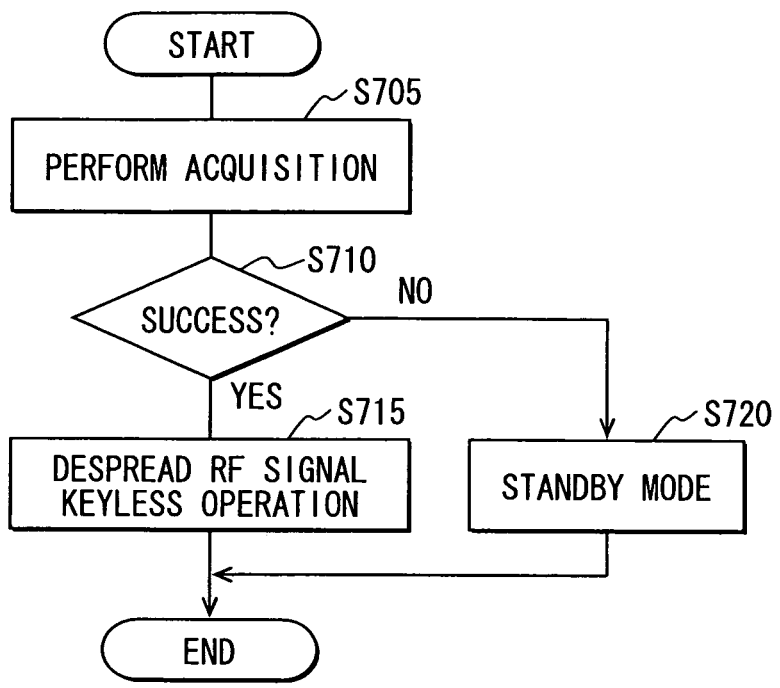
FIG. 6 is a flowchart showing a synchronous acquisition control process.

Next, the synchronous acquisition control process in which the synchronous acquisition point is searched for a period corresponding to 1 bit of the transmission data will be described with reference to FIG. 6. The present process is a called from the RF signal receiving process as subroutine.

At S705, the CPU 42 of the in-vehicle RF receiver 4 sets a period from the present to when a receiving time of the RF signal for 1 bit of the transmission data elapses from the present as the object period. Then, the CPU 42 transmits a control signal to the sliding correlator 416 so that the sliding correlator 416 searches for the synchronous acquisition point for the object period, and thereby performing the synchronous acquisition. Then, the process proceeds to S710.

At S710, the CPU 42 determines whether the synchronous acquisition at S705 succeeds. When the CPU 42 determines that the synchronous acquisition at S705 succeeds, which corresponds to "YES" at S710, the process proceeds to S715. When the CPU 42 determines that the synchronous acquisition at S705 does not succeed, which corresponds to "NO" at S715, the process proceeds to S720.

At S715, the CPU 42 transmits a control signal to the despreading portion 418 so that the despreading portion 418 starts despreading the demodulated RF signal. When the synchronous acquisition in the present process succeeds, the received RF signal is based on the keyless signal. Thus, the CPU 42 performs the process in the keyless entry system based on the keyless signal and ends the present process.

At S720, the CPU 42 changes the mode of the in-vehicle RF receiver 4 to the standby mode and ends the present process. The in-vehicle RF receiver 4 according to the present embodiment performs the synchronous acquisition of the smart signal by searching for the synchronous acquisition point for the search period not for a period that has a length of 1 bit of the transmission data. Thus, a time required for completing the synchronous acquisition of the smart signal can be reduced, and a responsiveness of the smart entry system can be improved.

When the CPU 42 fails in the synchronous acquisition for the first search period, the CPU 42 performs the synchronous acquisition for the residual period. Thus, by the two synchronous acquisitions, the CPU 42 performs the synchronous acquisition for a period corresponding to 1 bit of the transmission data. Thus, even when the in-vehicle RF receiver 4 receives the keyless signal instead of the smart signal, the CPU 42 can perform the synchronous acquisition without delay.

Although the present invention has been fully described in connection with the preferred embodiments thereof with reference to the accompanying drawings, it is to be noted that various changes and modifications will become apparent to those skilled in the art.

In the above-described embodiment, the synchronous acquisition based on the synchronization signal is applied to a wireless communication by a spread spectrum method in the keyless and smart entry system. The synchronous acquisition based on the synchronization signal may also be applied to other wireless communication system.

In the above description of the RF signal receiving process, it is assumed that the sliding correlator 416 buffers the input signal and performs the synchronous acquisition for the buffered input signal. Also in a case where the sliding correlator 416 performs the synchronous acquisition by performing the correlation observation in real time with respect to the input signal or in a case where the matched filter is provided instead of the sliding correlator 416, a similar process can be performed. In the case where the sliding correlator 416 performs the synchronous acquisition by performing the correlation observation in real time or in the case where synchronous acquisition is performed with the matched filter, the receiving time of the RF signal required for searching for the synchronous acquisition point for a predetermined period differs from the receiving time of the above-described embodiment. For example, the B-period in FIG. 4B is required to be set in accordance with the receiving time.

In the above-described embodiments, the correlation observation is performed by shifting the phase of the spreading code by 1 chip and the intervals of shifting the phase is the same as a sampling rate of the demodulated RF signal. The intervals of shifting the phase are not limited to 1 chip. For example, the correlation observation may also be performed while shifting the phase of the spreading signal at intervals of M times of the sampling rate of the RF signal (M is an integral number), that is, while shifting the phase by 1/M chip. By decreasing the intervals of shifting the phase, an accuracy of the synchronous acquisition can be improved.

In the above-described embodiments, the smart signal can function as a first signal, the keyless signal can function as a second signal, the process at S615 in the RF signal receiving process can function as a first synchronous acquisition process, and the process at S625 can function as a second synchronous acquisition process, as an example.

What is claimed is:

1. A wireless communication system comprising:
a portable device configured to spread one of a first signal and a second signal by a first spreading code and to transmit a wireless signal that is a respective one of a spread first signal and a spread second signal; and
an in-vehicle device configured to receive the wireless signal and to despread a received wireless signal by a second spreading code identical to the first spreading code to wirelessly communicate with the portable device by a spread spectrum method, wherein:
the in-vehicle device transmits a synchronization signal to the portable device to inform the portable device of a reference period determined by the in-vehicle device;
when the portable device receives the synchronization signal while the portable device is not transmitting the spread second signal, the portable device changes the first spreading code synchronously with the synchronization signal, spreads the first signal by the changed first spreading code, and transmits the spread first signal;
when the portable device receives an operation of a button, the portable device stops transmitting the spread first signal, spreads the second signal by the first spreading code, and transmits the spread second signal;
when the in-vehicle device receives the wireless signal after transmitting the synchronization signal, the in-vehicle device performs a first synchronous acquisition process of searching for a synchronous acquisition point for a search period;
the synchronous acquisition point is a point where a correlation value in despreading becomes a maximum value;
the search period is determined based on a variation range in a delay time from when the in-vehicle device transmits the synchronization signal to when the portable device transmits the spread first signal;
the search period is from a search starting point to a search ending point and is shorter than the reference period;
when the in-vehicle device fails in the first synchronous acquisition process, the in-vehicle device performs a second synchronous acquisition process of searching for the synchronous acquisition point for a residual period;
the residual period starts at the search ending point and ends at an ending point of the reference period when a starting point of the reference period is set at the search starting point;
when the in-vehicle device succeeds in one of the first synchronous acquisition process and the second synchronous acquisition process, the in-vehicle device changes the second spreading code synchronously with the received wireless signal, and despreads the received wireless signal by a changed second spreading code; and
when the in-vehicle device fails in the second synchronous acquisition process, the in-vehicle device searches for the synchronous acquisition point in period that starts after the residual period ends and has a length same as the reference period.

2. The wireless communication system according to claim 1, wherein
when the in-vehicle device detects a failure in despreading after starting despreading, the in-vehicle device searches for the synchronous acquisition point for a period that starts after the in-vehicle device detects the failure and has a length same as the reference period.

3. The wireless communication system according to claim 2, wherein when the in-vehicle device succeeds in the first synchronous acquisition, the in-vehicle device performs a process based on the first signal obtained by despreading, and
when the in-vehicle device receives the wireless signal from the portable device while the in-vehicle device is performing the process based on the first signal, the in-vehicle device searches for the synchronous acquisition point for a period that starts after the in-vehicle device starts receiving the wireless signal and has a length same as the reference period.

4. The wireless communication system according to claim 2, wherein:
the in-vehicle device has a standby mode and a normal mode;
when the in-vehicle device is in the standby mode, the in-vehicle device does not receive the wireless signal from the portable device for reducing electric power consumption;
when the in-vehicle device is in the normal mode, the in-vehicle device receives the wireless signal from the portable device;
a mode of the in-vehicle device changes from the standby mode to the normal mode at intervals of a first predetermined time;
the mode of the in-vehicle device changes from the normal mode to the standby mode at a second predetermined time;
the reference period is determined based on the intervals of the first predetermined time;
the portable device transmits the spread second signal including a preliminary part and a main part;
the preliminary part is transmitted for a period corresponding to a sum of the first predetermined time and a receiving time of the wireless signal for which the synchronous acquisition point is searched in the first synchronous acquisition process and the second synchronous acquisition process; and
the main part includes a transmission data from the portable device to the in-vehicle device and is transmitted following the preliminary part.

5. The wireless communication system according to claim 3, wherein:
the in-vehicle device has a standby mode and a normal mode;
when the in-vehicle device is in the standby mode, the in-vehicle device does not receive the wireless signal from the portable device for reducing electric power consumption;
when the in-vehicle device is in the normal mode, the in-vehicle device receives the wireless signal from the portable device;
a mode of the in-vehicle device changes from the standby mode to the normal mode at intervals of a first predetermined time;
the mode of the in-vehicle device changes from the normal mode to the standby mode at a second predetermined time;
the reference period is determined based on the intervals of the first predetermined time;
the portable device transmits the spread second signal including a preliminary part and a main part;
the preliminary part is transmitted for a period corresponding to a sum of the first predetermined time and a receiving time of the wireless signal for which the synchronous acquisition point is searched in the first synchronous acquisition process and the second synchronous acquisition process; and the main part includes a transmission data from the portable device to the in-vehicle device and is transmitted following the preliminary part.

6. The wireless communication system according to claim 1, wherein when the in-vehicle device succeeds in the first synchronous acquisition, the in-vehicle device performs a process based on the first signal obtained by despreading, and when the in-vehicle device receives the wireless signal from the portable device while the in-vehicle device is performing the process based on the first signal, the in-vehicle device searches for the synchronous acquisition point for a period that starts after the in-vehicle device starts receiving the wireless signal and has a length same as the reference period.

7. The wireless communication system according to claim 6, wherein:

the in-vehicle device has a standby mode and a normal mode;

when the in-vehicle device is in the standby mode, the in-vehicle device does not receive the wireless signal from the portable device for reducing electric power consumption;

when the in-vehicle device is in the normal mode, the in-vehicle device receives the wireless signal from the portable device;

a mode of the in-vehicle device changes from the standby mode to the normal mode at intervals of a first predetermined time;

the mode of the in-vehicle device changes from the normal mode to the standby mode at a second predetermined time;

the reference period is determined based on the intervals of the first predetermined time;

the portable device transmits the spread second signal including a preliminary part and a main part;

the preliminary part is transmitted for a period corresponding to a sum of the first predetermined time and a receiving time of the wireless signal for which the synchronous acquisition point is searched in the first synchronous acquisition process and the second synchronous acquisition process; and the main part includes a transmission data from the portable device to the in-vehicle device and is transmitted following the preliminary part.

8. The wireless communication system according to claim 1, wherein:

the in-vehicle device has a standby mode and a normal mode;

when the in-vehicle device is in the standby mode, the in-vehicle device does not receive the wireless signal from the portable device for reducing electric power consumption;

when the in-vehicle device is in the normal mode, the in-vehicle device receives the wireless signal from the portable device;

a mode of the in-vehicle device changes from the standby mode to the normal mode at intervals of a first predetermined time;

the mode of the in-vehicle device changes from the normal mode to the standby mode at a second predetermined time;

the reference period is determined based on the intervals of the first predetermined time;

the portable device transmits the spread second signal including a preliminary part and a main part;

the preliminary part is transmitted for a period corresponding to a sum of the first predetermined time and a receiving time of the wireless signal for which the synchronous acquisition point is searched in the first synchronous acquisition process and the second synchronous acquisition process; and the main part includes a transmission data from the portable device to the in-vehicle device and is transmitted following the preliminary part.

9. A wireless communication system comprising:

a portable device configured to spread one of a first signal and a second signal by a first spreading code and to transmit a wireless signal that is a respective one of a spread first signal and a spread second signal; and an in-vehicle device configured to receive the wireless signal and to despread a received wireless signal by a second spreading code identical to the first spreading code to wirelessly communicate with the portable device by a spread spectrum method, wherein:

the in-vehicle device transmits a synchronization signal to the portable device to inform the portable device of a reference period determined by the in-vehicle device;

when the portable device receives the synchronization signal while the portable device is not transmitting the spread second signal, the portable device changes the first spreading code synchronously with the synchronization signal, spreads the first signal by the changed first spreading code, and transmits the spread first signal;

when the portable device receives an operation of a button, the portable device stops transmitting the spread first signal, spreads the second signal by the first spreading code, and transmits the spread second signal;

when the in-vehicle device receives the wireless signal after transmitting the synchronization signal, the in-vehicle device performs a first synchronous acquisition process of searching for a synchronous acquisition point for a search period;

the synchronous acquisition point is a point where a correlation value in despreading becomes a maximum value;

the search period is determined based on a variation range in a delay time from when the in-vehicle device transmits the synchronization signal to when the portable device transmits the spread first signal;

the search period is from a search starting point to a search ending point and is shorter than the reference period;

when the in-vehicle device fails in the first synchronous acquisition process, the in-vehicle device performs a second synchronous acquisition process of searching for the synchronous acquisition point for a residual period;

the residual period starts at the search ending point and ends at an ending point of the reference period when a starting point of the reference period is set at the search starting point;

when the in-vehicle device succeeds in one of the first synchronous acquisition process and the second synchronous acquisition process, the in-vehicle device changes the second spreading code synchronously with the received wireless signal, and despreads the received wireless signal by a changed second spreading code; and when the in-vehicle device detects a failure in despreading after starting despreading, the in-vehicle device searches for the synchronous acquisition point for a period that starts after the in-vehicle device detects the failure and has a length same as the reference period.

10. The wireless communication system according to claim 9, wherein
  when the in-vehicle device succeeds in the first synchronous acquisition, the in-vehicle device performs a process based on the first signal obtained by despreading, and
  when the in-vehicle device receives the wireless signal from the portable device while the in-vehicle device is performing the process based on the first signal, the in-vehicle device searches for the synchronous acquisition point for a period that starts after the in-vehicle device starts receiving the wireless signal and has a length same as the reference period.

11. The wireless communication system according to claim 9, wherein:
  the in-vehicle device has a standby mode and a normal mode;
  when the in-vehicle device is in the standby mode, the in-vehicle device does not receive the wireless signal from the portable device for reducing electric power consumption;
  when the in-vehicle device is in the normal mode, the in-vehicle device receives the wireless signal from the portable device;
  a mode of the in-vehicle device changes from the standby mode to the normal mode at intervals of a first predetermined time;
  the mode of the in-vehicle device changes from the normal mode to the standby mode at a second predetermined time;
  the reference period is determined based on the intervals of the first predetermined time;
  the portable device transmits the spread second signal including a preliminary part and a main part;
  the preliminary part is transmitted for a period corresponding to a sum of the first predetermined time and a receiving time of the wireless signal for which the synchronous acquisition point is searched in the first synchronous acquisition process and the second synchronous acquisition process; and
  the main part includes a transmission data from the portable device to the in-vehicle device and is transmitted following the preliminary part.

12. The wireless communication system according to claim 10, wherein:
  the in-vehicle device has a standby mode and a normal mode;
  when the in-vehicle device is in the standby mode, the in-vehicle device does not receive the wireless signal from the portable device for reducing electric power consumption;
  when the in-vehicle device is in the normal mode, the in-vehicle device receives the wireless signal from the portable device;
  a mode of the in-vehicle device changes from the standby mode to the normal mode at intervals of a first predetermined time;
  the mode of the in-vehicle device changes from the normal mode to the standby mode at a second predetermined time;
  the reference period is determined based on the intervals of the first predetermined time;
  the portable device transmits the spread second signal including a preliminary part and a main part;
  the preliminary part is transmitted for a period corresponding to a sum of the first predetermined time and a receiving time of the wireless signal for which the synchronous acquisition point is searched in the first synchronous acquisition process and the second synchronous acquisition process; and
  the main part includes a transmission data from the portable device to the in-vehicle device and is transmitted following the preliminary part.

13. A wireless communication system comprising:
  a portable device configured to spread one of a first signal and a second signal by a first spreading code and to transmit a wireless signal that is a respective one of a spread first signal and a spread second signal; and
  an in-vehicle device configured to receive the wireless signal and to despread a received wireless signal by a second spreading code identical to the first spreading code to wirelessly communicate with the portable device by a spread spectrum method, wherein:
  the in-vehicle device transmits a synchronization signal to the portable device to inform the portable device of a reference period determined by the in-vehicle device;
  when the portable device receives the synchronization signal while the portable device is not transmitting the spread second signal, the portable device changes the first spreading code synchronously with the synchronization signal, spreads the first signal by the changed first spreading code, and transmits the spread first signal;
  when the portable device receives an operation of a button, the portable device stops transmitting the spread first signal, spreads the second signal by the first spreading code, and transmits the spread second signal;
  when the in-vehicle device receives the wireless signal after transmitting the synchronization signal, the in-vehicle device performs a first synchronous acquisition process of searching for a synchronous acquisition point for a search period;
  the synchronous acquisition point is a point where a correlation value in despreading becomes a maximum value;
  the search period is determined based on a variation range in a delay time from when the in-vehicle device transmits the synchronization signal to when the portable device transmits the spread first signal;
  the search period is from a search starting point to a search ending point and is shorter than the reference period;
  when the in-vehicle device fails in the first synchronous acquisition process, the in-vehicle device performs a second synchronous acquisition process of searching for the synchronous acquisition point for a residual period;
  the residual period starts at the search ending point and ends at an ending point of the reference period when a starting point of the reference period is set at the search starting point;
  when the in-vehicle device succeeds in one of the first synchronous acquisition process and the second synchronous acquisition process, the in-vehicle device changes the second spreading code synchronously with the received wireless signal, and despreads the received wireless signal by a changed second spreading code;
  when the in-vehicle device succeeds in the first synchronous acquisition, the in-vehicle device performs a process based on the first signal obtained by despreading, and
  when the in-vehicle device receives the wireless signal from the portable device while the in-vehicle device is performing the process based on the first signal, the in-vehicle device searches for the synchronous acquisition point for a period that starts after the in-vehicle device starts receiving the wireless signal and has a length same as the reference period.

14. The wireless communication system according to claim 13, wherein:
the in-vehicle device has a standby mode and a normal mode;
when the in-vehicle device is in the standby mode, the in-vehicle device does not receive the wireless signal from the portable device for reducing electric power consumption;
when the in-vehicle device is in the normal mode, the in-vehicle device receives the wireless signal from the portable device;
a mode of the in-vehicle device changes from the standby mode to the normal mode at intervals of a first predetermined time;
the mode of the in-vehicle device changes from the normal mode to the standby mode at a second predetermined time;
the reference period is determined based on the intervals of the first predetermined time;
the portable device transmits the spread second signal including a preliminary part and a main part;
the preliminary part is transmitted for a period corresponding to a sum of the first predetermined time and a receiving time of the wireless signal for which the synchronous acquisition point is searched in the first synchronous acquisition process and the second synchronous acquisition process; and
the main part includes a transmission data from the portable device to the in-vehicle device and is transmitted following the preliminary part.

15. A wireless communication system comprising:
a portable device configured to spread one of a first signal and a second signal by a first spreading code and to transmit a wireless signal that is a respective one of a spread first signal and a spread second signal; and
an in-vehicle device configured to receive the wireless signal and to despread a received wireless signal by a second spreading code identical to the first spreading code to wirelessly communicate with the portable device by a spread spectrum method, wherein:
the in-vehicle device transmits a synchronization signal to the portable device to inform the portable device of a reference period determined by the in-vehicle device;
when the portable device receives the synchronization signal while the portable device is not transmitting the spread second signal, the portable device changes the first spreading code synchronously with the synchronization signal, spreads the first signal by the changed first spreading code, and transmits the spread first signal;
when the portable device receives an operation of a button, the portable device stops transmitting the spread first signal, spreads the second signal by the first spreading code, and transmits the spread second signal;
when the in-vehicle device receives the wireless signal after transmitting the synchronization signal, the in-vehicle device performs a first synchronous acquisition process of searching for a synchronous acquisition point for a search period;
the synchronous acquisition point is a point where a correlation value in despreading becomes a maximum value;
the search period is determined based on a variation range in a delay time from when the in-vehicle device transmits the synchronization signal to when the portable device transmits the spread first signal;
the search period is from a search starting point to a search ending point and is shorter than the reference period;
when the in-vehicle device fails in the first synchronous acquisition process, the in-vehicle device performs a second synchronous acquisition process of searching for the synchronous acquisition point for a residual period;
the residual period starts at the search ending point and ends at an ending point of the reference period when a starting point of the reference period is set at the search starting point;
when the in-vehicle device succeeds in one of the first synchronous acquisition process and the second synchronous acquisition process, the in-vehicle device changes the second spreading code synchronously with the received wireless signal, and despreads the received wireless signal by a changed second spreading code;
the in-vehicle device has a standby mode and a normal mode;
when the in-vehicle device is in the standby mode, the in-vehicle device does not receive the wireless signal from the portable device for reducing electric power consumption;
when the in-vehicle device is in the normal mode, the in-vehicle device receives the wireless signal from the portable device;
a mode of the in-vehicle device changes from the standby mode to the normal mode at intervals of a first predetermined time;
the mode of the in-vehicle device changes from the normal mode to the standby mode at a second predetermined time;
the reference period is determined based on the intervals of the first predetermined time;
the portable device transmits the spread second signal including a preliminary part and a main part;
the preliminary part is transmitted for a period corresponding to a sum of the first predetermined time and a receiving time of the wireless signal for which the synchronous acquisition point is searched in the first synchronous acquisition process and the second synchronous acquisition process; and
the main part includes a transmission data from the portable device to the in-vehicle device and is transmitted following the preliminary part.

* * * * *